US010915749B2

(12) United States Patent
Ross et al.

(10) Patent No.: US 10,915,749 B2
(45) Date of Patent: Feb. 9, 2021

(54) AUTHENTICATION OF A SUSPECT OBJECT USING EXTRACTED NATIVE FEATURES

(71) Applicant: ALITHEON, INC., Bellevue, WA (US)

(72) Inventors: David Ross, Bellevue, WA (US); Brian Elmenhurst, Bellevue, WA (US); Mark Tocci, Bellevue, WA (US); John Forbes, Bellevue, WA (US); Heather Wheelock Ross, Bellevue, WA (US)

(73) Assignee: ALITHEON, INC., Bellevue, WA (US)

( * ) Notice: Subject to any disclaimer, the term of this patent is extended or adjusted under 35 U.S.C. 154(b) by 82 days.

(21) Appl. No.: 16/041,710

(22) Filed: Jul. 20, 2018

(65) Prior Publication Data

US 2018/0349694 A1    Dec. 6, 2018

Related U.S. Application Data

(60) Division of application No. 15/044,034, filed on Feb. 15, 2016, now Pat. No. 10,043,073, which is a
(Continued)

(51) Int. Cl.
*G06K 9/00* (2006.01)
*G06F 16/583* (2019.01)
(Continued)

(52) U.S. Cl.
CPC ........ *G06K 9/00483* (2013.01); *B07C 5/3422* (2013.01); *G06F 16/2468* (2019.01);
(Continued)

(58) Field of Classification Search
CPC ..................................................... G06Q 50/32
See application file for complete search history.

(56) References Cited

U.S. PATENT DOCUMENTS

| 4,218,674 A | 8/1980 | Brosow et al. |
| 4,423,415 A | 12/1983 | Goldman |

(Continued)

FOREIGN PATENT DOCUMENTS

| DE | 10 2006 005 927 A1 | 8/2007 |
| EP | 0 439 669 A2 | 8/1991 |

(Continued)

OTHER PUBLICATIONS

Bao et al., "Local Feature based Multiple Object Instance Identification using Scale and Rotation Invariant Implicit Shape Model," *12th Asian Conference on Computer Vision*, Singapore, Singapore, Nov. 1-5, 2014, pp. 600-614.

(Continued)

*Primary Examiner* — Oneal R Mistry
(74) *Attorney, Agent, or Firm* — Cozen O'Connor

(57) ABSTRACT

A forgery detection system includes a computer server and a database system of digital fingerprint records corresponding to forged or altered objects of a given object type. Using the computer server, a digital image of a suspect object of the given object type is accessed, an authentication region is selected, and a native feature within the authentication region is extracted. The native feature describes physical characteristics of the authentication region without recognizing content that appears in the authentication region. The computer server forms a feature vector to represent the native feature in a compact form and queries the database system to obtain a result responsive to digital fingerprint records that match the feature vector. Each matching digital fingerprint record is counted, and if the count of fraud indicator matches crosses a predetermined threshold indicating a confidence level that the suspect object is forged or altered, a report based is generated and communicated to a user interface.

19 Claims, 7 Drawing Sheets

Related U.S. Application Data division of application No. 14/531,307, filed on Nov. 3, 2014, now Pat. No. 9,582,714, which is a continuation of application No. 14/290,653, filed on May 29, 2014, now Pat. No. 9,350,552, which is a continuation of application No. 13/410,753, filed on Mar. 2, 2012, now Pat. No. 8,774,455, said application No. 14/531,307 is a continuation of application No. 13/618,362, filed on Sep. 14, 2012, now Pat. No. 9,152,862.

(60) Provisional application No. 61/898,780, filed on Nov. 1, 2013, provisional application No. 61/914,722, filed on Dec. 11, 2013, provisional application No. 61/448,465, filed on Mar. 2, 2011, provisional application No. 61/535,084, filed on Sep. 15, 2011.

(51) Int. Cl.

| | | |
|---|---|---|
| *G06F 16/2458* | (2019.01) | |
| *G06K 9/32* | (2006.01) | |
| *G06T 7/90* | (2017.01) | |
| *B07C 5/342* | (2006.01) | |
| *H04L 9/32* | (2006.01) | |
| *G06K 9/46* | (2006.01) | |
| *G06K 9/52* | (2006.01) | |
| *G06T 7/60* | (2017.01) | |
| *G06Q 50/32* | (2012.01) | |

(52) U.S. Cl.
CPC ........ *G06F 16/583* (2019.01); *G06F 16/5846* (2019.01); *G06K 9/3216* (2013.01); *G06K 9/4652* (2013.01); *G06K 9/52* (2013.01); *G06T 7/60* (2013.01); *G06T 7/90* (2017.01); *H04L 9/3247* (2013.01); *G06K 2209/01* (2013.01); *G06Q 50/32* (2013.01)

(56) References Cited

U.S. PATENT DOCUMENTS

| | | |
|---|---|---|
| 4,677,435 A | 6/1987 | Causse D'Agraives et al. |
| 4,700,400 A | 10/1987 | Ross |
| 4,921,107 A | 5/1990 | Hofer |
| 5,031,223 A | 7/1991 | Rosenbaum et al. |
| 5,079,714 A | 1/1992 | Manduley et al. |
| 5,393,939 A | 2/1995 | Nasuta, Jr. et al. |
| 5,422,821 A | 6/1995 | Allen et al. |
| 5,514,863 A | 5/1996 | Williams |
| 5,518,122 A | 5/1996 | Tilles et al. |
| 5,521,984 A | 5/1996 | Denenberg et al. |
| 5,703,783 A | 12/1997 | Allen et al. |
| 5,719,939 A | 2/1998 | Tel |
| 5,734,568 A | 3/1998 | Borgendale et al. |
| 5,745,590 A | 4/1998 | Pollard |
| 5,883,971 A | 3/1999 | Bolle et al. |
| 5,923,848 A | 7/1999 | Goodhand et al. |
| 5,974,150 A | 10/1999 | Kaish et al. |
| 6,205,261 B1 | 3/2001 | Goldberg |
| 6,246,794 B1 | 6/2001 | Kagehiro et al. |
| 6,292,709 B1 | 9/2001 | Uhl et al. |
| 6,327,373 B1 | 12/2001 | Yura |
| 6,343,327 B2 | 1/2002 | Daniels, Jr. et al. |
| 6,360,001 B1 | 3/2002 | Berger et al. |
| 6,370,259 B1 | 4/2002 | Hobson et al. |
| 6,400,805 B1 | 6/2002 | Brown et al. |
| 6,424,728 B1 | 7/2002 | Ammar |
| 6,434,601 B1 | 8/2002 | Rollins |
| 6,470,091 B2 | 10/2002 | Koga et al. |
| 6,539,098 B1 | 3/2003 | Baker et al. |
| 6,549,892 B1 | 4/2003 | Sansone |
| 6,597,809 B1 | 7/2003 | Ross et al. |
| 6,643,648 B1 | 11/2003 | Ross et al. |
| 6,697,500 B2 | 2/2004 | Woolston et al. |
| 6,741,724 B1 | 5/2004 | Bruce et al. |
| 6,768,810 B2 | 7/2004 | Emanuelsson et al. |
| 6,778,703 B1 | 8/2004 | Zlotnick |
| 6,805,926 B2 | 10/2004 | Cote et al. |
| 6,816,602 B2 | 11/2004 | Coffelt et al. |
| 6,829,369 B2 | 12/2004 | Poulin et al. |
| 6,961,466 B2 | 11/2005 | Imagawa et al. |
| 6,985,926 B1 | 1/2006 | Ferlauto et al. |
| 7,016,532 B2 | 3/2006 | Boncyk et al. |
| 7,031,519 B2 | 4/2006 | Elmenhurst |
| 7,096,152 B1 | 8/2006 | Ong |
| 7,120,302 B1 | 10/2006 | Billester |
| 7,121,458 B2 | 10/2006 | Avant et al. |
| 7,152,047 B1 | 12/2006 | Nagel |
| 7,171,049 B2 | 1/2007 | Snapp |
| 7,204,415 B2 | 4/2007 | Payne et al. |
| 7,212,949 B2 | 5/2007 | Bachrach |
| 7,333,987 B2 | 2/2008 | Ross et al. |
| 7,343,623 B2 | 3/2008 | Ross |
| 7,356,162 B2 | 4/2008 | Caillon |
| 7,379,603 B2 | 5/2008 | Ross et al. |
| 7,436,979 B2 | 10/2008 | Bruce |
| 7,477,780 B2 | 1/2009 | Boncyk et al. |
| 7,518,080 B2 | 4/2009 | Amato |
| 7,602,938 B2 | 10/2009 | Proloski |
| 7,674,995 B2 | 3/2010 | Desprez et al. |
| 7,676,433 B1 | 3/2010 | Ross et al. |
| 7,680,306 B2 | 3/2010 | Boutant et al. |
| 7,720,256 B2 | 5/2010 | Desprez et al. |
| 7,726,457 B2 | 6/2010 | Maier et al. |
| 7,726,548 B2 | 6/2010 | DeLaVergne |
| 7,748,029 B2 | 6/2010 | Ross |
| 7,822,263 B1 | 10/2010 | Prokoski |
| 7,834,289 B2 | 11/2010 | Orbke |
| 7,853,792 B2 | 12/2010 | Cowburn |
| 8,022,832 B2 | 9/2011 | Vogt et al. |
| 8,032,927 B2 | 10/2011 | Ross |
| 8,108,309 B2 | 1/2012 | Tan |
| 8,180,174 B2 | 5/2012 | Di Venuto |
| 8,180,667 B1 | 5/2012 | Baluja et al. |
| 8,194,938 B2 | 6/2012 | Wechsler et al. |
| 8,316,418 B2 | 11/2012 | Ross |
| 8,374,399 B1 | 2/2013 | Talwerdi |
| 8,374,920 B2 | 2/2013 | Hedges et al. |
| 8,391,583 B1 | 3/2013 | Mennie et al. |
| 8,428,772 B2 | 4/2013 | Miette |
| 8,437,530 B1 | 5/2013 | Mennie et al. |
| 8,457,354 B1 | 6/2013 | Kolar et al. |
| 8,477,992 B2 | 7/2013 | Paul et al. |
| 8,520,888 B2 | 8/2013 | Spitzig |
| 8,526,743 B1 | 9/2013 | Campbell et al. |
| 8,774,455 B2 | 7/2014 | Elmenhurst et al. |
| 9,031,329 B1 | 5/2015 | Farid et al. |
| 9,058,543 B2 | 6/2015 | Campbell |
| 9,152,862 B2 | 10/2015 | Ross |
| 9,170,654 B2 | 10/2015 | Boncyk et al. |
| 9,224,196 B2 | 12/2015 | Duerksen et al. |
| 9,234,843 B2 | 1/2016 | Sopori et al. |
| 9,245,133 B1 | 1/2016 | Durst et al. |
| 9,350,552 B2 | 5/2016 | Elmenhurst et al. |
| 9,350,714 B2 | 5/2016 | Freeman et al. |
| 9,361,596 B2 | 6/2016 | Ross et al. |
| 9,558,463 B2 | 1/2017 | Ross et al. |
| 9,582,714 B2 | 2/2017 | Ross et al. |
| 9,646,206 B2 | 5/2017 | Ross et al. |
| 10,043,073 B2 | 8/2018 | Ross et al. |
| 10,199,886 B2 | 2/2019 | Li et al. |
| 10,540,664 B2 | 1/2020 | Ross et al. |
| 10,572,883 B2 | 2/2020 | Ross et al. |
| 10,621,594 B2 | 4/2020 | Land et al. |
| 2001/0010334 A1 | 8/2001 | Park et al. |
| 2001/0054031 A1 | 12/2001 | Lee et al. |
| 2002/0015515 A1 | 2/2002 | Lichtermann et al. |
| 2002/0073049 A1 | 6/2002 | Dutta |
| 2002/0168090 A1 | 11/2002 | Bruce et al. |
| 2003/0015395 A1 | 1/2003 | Hallowell et al. |
| 2003/0046103 A1 | 3/2003 | Amato et al. |
| 2003/0091724 A1 | 5/2003 | Mizoguchi |
| 2003/0120677 A1 | 6/2003 | Vernon |

(56) References Cited

U.S. PATENT DOCUMENTS

| | | |
|---|---|---|
| 2003/0138128 A1 | 7/2003 | Rhoads |
| 2003/0179931 A1 | 9/2003 | Sun |
| 2003/0182018 A1 | 9/2003 | Snapp |
| 2003/0208298 A1 | 11/2003 | Edmonds |
| 2003/0219145 A1 | 11/2003 | Smith |
| 2004/0027630 A1 | 2/2004 | Lizotte |
| 2004/0101174 A1 | 5/2004 | Sato et al. |
| 2004/0112962 A1 | 6/2004 | Farrall et al. |
| 2004/0218791 A1 | 11/2004 | Jiang et al. |
| 2004/0218801 A1* | 11/2004 | Houle ............... G06K 9/00154 382/137 |
| 2005/0007776 A1 | 1/2005 | Monk et al. |
| 2005/0038756 A1 | 2/2005 | Nagel |
| 2005/0065719 A1 | 3/2005 | Khan et al. |
| 2005/0086256 A1 | 4/2005 | Owens et al. |
| 2005/0111618 A1 | 5/2005 | Sommer et al. |
| 2005/0119786 A1 | 6/2005 | Kadaba |
| 2005/0125360 A1 | 6/2005 | Tidwell et al. |
| 2005/0131576 A1 | 6/2005 | De Leo et al. |
| 2005/0137882 A1 | 6/2005 | Cameron et al. |
| 2005/0160271 A9 | 7/2005 | Brundage et al. |
| 2005/0169529 A1 | 8/2005 | Owechko et al. |
| 2005/0188213 A1 | 8/2005 | Xu |
| 2005/0204144 A1 | 9/2005 | Mizutani |
| 2005/0251285 A1 | 11/2005 | Boyce et al. |
| 2005/0257064 A1 | 11/2005 | Boutant et al. |
| 2005/0289061 A1 | 12/2005 | Kulakowski et al. |
| 2006/0010503 A1 | 1/2006 | Inoue et al. |
| 2006/0083414 A1 | 4/2006 | Neumann et al. |
| 2006/0109520 A1 | 5/2006 | Gossaye et al. |
| 2006/0131518 A1 | 6/2006 | Ross et al. |
| 2006/0177104 A1 | 8/2006 | Prokoski |
| 2006/0253406 A1 | 11/2006 | Caillon |
| 2007/0071291 A1 | 3/2007 | Yumoto et al. |
| 2007/0085710 A1 | 4/2007 | Bousquet et al. |
| 2007/0094155 A1 | 4/2007 | Dearing |
| 2007/0211651 A1 | 9/2007 | Ahmed et al. |
| 2007/0211964 A1* | 9/2007 | Agam ............... G06K 9/00161 382/305 |
| 2007/0230656 A1 | 10/2007 | Lowes et al. |
| 2007/0263267 A1 | 11/2007 | Ditt |
| 2007/0269043 A1* | 11/2007 | Launay ............... G07F 7/1008 380/46 |
| 2007/0282900 A1 | 12/2007 | Owens et al. |
| 2008/0008377 A1 | 1/2008 | Andel et al. |
| 2008/0011841 A1 | 1/2008 | Self et al. |
| 2008/0128496 A1 | 6/2008 | Bertranou et al. |
| 2008/0130947 A1 | 6/2008 | Ross et al. |
| 2008/0219503 A1 | 9/2008 | Di Venuto et al. |
| 2008/0250483 A1 | 10/2008 | Lee |
| 2008/0255758 A1 | 10/2008 | Graham et al. |
| 2008/0272585 A1 | 11/2008 | Conard et al. |
| 2008/0290005 A1 | 11/2008 | Bennett et al. |
| 2008/0294474 A1 | 11/2008 | Furka |
| 2009/0028379 A1 | 1/2009 | Belanger et al. |
| 2009/0057207 A1 | 3/2009 | Orbke et al. |
| 2009/0106042 A1 | 4/2009 | Maytal et al. |
| 2009/0134222 A1 | 5/2009 | Ikeda |
| 2009/0154778 A1 | 6/2009 | Lei et al. |
| 2009/0157733 A1 | 6/2009 | Kim et al. |
| 2009/0223099 A1 | 9/2009 | Versteeg |
| 2009/0232361 A1 | 9/2009 | Miller |
| 2009/0245652 A1 | 10/2009 | Bastos dos Santos |
| 2009/0271029 A1 | 10/2009 | Doutre |
| 2009/0287498 A2 | 11/2009 | Choi |
| 2009/0307005 A1 | 12/2009 | O'Martin et al. |
| 2010/0027834 A1 | 2/2010 | Spitzig et al. |
| 2010/0070527 A1 | 3/2010 | Chen |
| 2010/0104200 A1 | 4/2010 | Baras et al. |
| 2010/0157064 A1 | 6/2010 | Cheng et al. |
| 2010/0163612 A1 | 7/2010 | Caillon |
| 2010/0166303 A1 | 7/2010 | Rahimi |
| 2010/0174406 A1 | 7/2010 | Miette et al. |
| 2010/0286815 A1 | 11/2010 | Zimmermann |
| 2011/0026831 A1 | 2/2011 | Perronnin et al. |
| 2011/0064279 A1 | 3/2011 | Uno |
| 2011/0081043 A1 | 4/2011 | Sabol et al. |
| 2011/0091068 A1 | 4/2011 | Stuck et al. |
| 2011/0161117 A1 | 6/2011 | Busque et al. |
| 2011/0188709 A1 | 8/2011 | Gupta et al. |
| 2011/0194780 A1 | 8/2011 | Li et al. |
| 2011/0235920 A1 | 9/2011 | Iwamoto et al. |
| 2011/0267192 A1 | 11/2011 | Goldman et al. |
| 2012/0042171 A1 | 2/2012 | White et al. |
| 2012/0089639 A1 | 4/2012 | Wang |
| 2012/0130868 A1 | 5/2012 | Løken |
| 2012/0177281 A1* | 7/2012 | Frew ............... G06Q 20/042 382/137 |
| 2012/0185393 A1 | 7/2012 | Atsmon et al. |
| 2012/0199651 A1 | 8/2012 | Glazer |
| 2012/0242481 A1 | 9/2012 | Gernandt et al. |
| 2012/0243797 A1 | 9/2012 | Dayer et al. |
| 2012/0250945 A1 | 10/2012 | Peng et al. |
| 2013/0212027 A1 | 8/2013 | Sharma et al. |
| 2013/0214164 A1 | 8/2013 | Zhang et al. |
| 2013/0273968 A1* | 10/2013 | Rhoads ............... H04W 4/50 455/556.1 |
| 2013/0277425 A1 | 10/2013 | Sharma et al. |
| 2013/0284803 A1 | 10/2013 | Wood et al. |
| 2014/0032322 A1 | 1/2014 | Schwieger et al. |
| 2014/0140570 A1 | 5/2014 | Ross et al. |
| 2014/0140571 A1 | 5/2014 | Elmenhurst et al. |
| 2014/0184843 A1 | 7/2014 | Campbell et al. |
| 2014/0201094 A1 | 7/2014 | Herrington et al. |
| 2014/0314283 A1 | 10/2014 | Harding |
| 2014/0380446 A1 | 12/2014 | Niu et al. |
| 2015/0058142 A1 | 2/2015 | Lenahan et al. |
| 2015/0078629 A1 | 3/2015 | Gottemukkula et al. |
| 2015/0086068 A1 | 3/2015 | Mulhearn et al. |
| 2015/0117701 A1 | 4/2015 | Ross et al. |
| 2015/0127430 A1 | 5/2015 | Hammer, III |
| 2015/0248587 A1 | 9/2015 | Oami et al. |
| 2015/0294189 A1 | 10/2015 | Benhimane et al. |
| 2015/0309502 A1 | 10/2015 | Breitgand et al. |
| 2016/0034914 A1 | 2/2016 | Gonen et al. |
| 2016/0055651 A1 | 2/2016 | Oami |
| 2016/0057138 A1 | 2/2016 | Hoyos et al. |
| 2016/0117631 A1 | 4/2016 | McCloskey et al. |
| 2016/0180546 A1 | 6/2016 | Kim et al. |
| 2016/0189510 A1 | 6/2016 | Hutz |
| 2016/0335520 A1 | 11/2016 | Ross et al. |
| 2017/0004444 A1 | 1/2017 | Krasko et al. |
| 2017/0032285 A1 | 2/2017 | Sharma et al. |
| 2017/0132458 A1 | 5/2017 | Short et al. |
| 2017/0243230 A1 | 8/2017 | Ross et al. |
| 2017/0243231 A1 | 8/2017 | Withrow et al. |
| 2017/0243232 A1 | 8/2017 | Ross et al. |
| 2017/0243233 A1 | 8/2017 | Land et al. |
| 2017/0253069 A1 | 9/2017 | Kerkar et al. |
| 2017/0295301 A1 | 10/2017 | Liu et al. |
| 2017/0300905 A1 | 10/2017 | Withrow et al. |
| 2017/0344823 A1 | 11/2017 | Withrow et al. |
| 2017/0372327 A1 | 12/2017 | Withrow |
| 2018/0012008 A1 | 1/2018 | Withrow et al. |
| 2018/0018627 A1 | 1/2018 | Ross et al. |
| 2018/0018838 A1 | 1/2018 | Fankhauser et al. |
| 2018/0024074 A1 | 1/2018 | Ranieri et al. |
| 2018/0024178 A1 | 1/2018 | House et al. |
| 2018/0047128 A1 | 2/2018 | Ross et al. |
| 2018/0053312 A1 | 2/2018 | Ross et al. |
| 2018/0121643 A1 | 5/2018 | Talwerdi et al. |
| 2018/0144211 A1 | 5/2018 | Ross et al. |
| 2018/0315058 A1 | 11/2018 | Withrow et al. |
| 2019/0026581 A1 | 1/2019 | Leizerson |
| 2019/0034518 A1 | 1/2019 | Liu et al. |
| 2019/0034694 A1 | 1/2019 | Ross |
| 2019/0102873 A1 | 4/2019 | Wang et al. |
| 2019/0228174 A1 | 7/2019 | Withrow et al. |
| 2019/0287118 A1 | 9/2019 | Ross et al. |
| 2020/0153822 A1 | 5/2020 | Land et al. |
| 2020/0226366 A1 | 7/2020 | Withrow et al. |
| 2020/0233901 A1 | 7/2020 | Crowley et al. |
| 2020/0250395 A1 | 8/2020 | Ross et al. |
| 2020/0257791 A1 | 8/2020 | Ross et al. |

(56) References Cited

U.S. PATENT DOCUMENTS

| | | |
|---|---|---|
| 2020/0334689 A1 | 10/2020 | Ross et al. |
| 2020/0349379 A1 | 11/2020 | Ross |
| 2020/0356772 A1 | 11/2020 | Withrow et al. |

FOREIGN PATENT DOCUMENTS

| | | |
|---|---|---|
| EP | 0 759 596 A2 | 2/1997 |
| EP | 1 016 548 A2 | 7/2000 |
| EP | 1 719 070 B1 | 4/2009 |
| EP | 2107506 A1 | 10/2009 |
| EP | 2166493 A1 | 3/2010 |
| EP | 2 195 621 B1 | 11/2013 |
| EP | 2 866 193 A1 | 4/2015 |
| EP | 2 257 909 B1 | 5/2015 |
| EP | 2 869 240 A2 | 5/2015 |
| EP | 2 869 241 A2 | 5/2015 |
| EP | 3208744 A1 | 8/2017 |
| EP | 3 249 581 A1 | 11/2017 |
| EP | 3270342 A1 | 1/2018 |
| EP | 3435287 A2 | 1/2019 |
| GB | 2 097 979 A | 11/1982 |
| GB | 2482127 A | 1/2012 |
| JP | 61-234481 A | 10/1986 |
| JP | 2007-213148 A | 8/2007 |
| KR | 20120009654 A | 2/2012 |
| WO | 2005/086616 A2 | 9/2005 |
| WO | 2006/038114 A1 | 4/2006 |
| WO | 2007/031176 A1 | 3/2007 |
| WO | WO2007028799 A1 | 3/2007 |
| WO | 2007/071788 A1 | 6/2007 |
| WO | 2007/090437 A1 | 8/2007 |
| WO | WO2007090437 A1 | 8/2007 |
| WO | 2007/144598 A1 | 12/2007 |
| WO | WO2007144598 A1 | 12/2007 |
| WO | 2009/030853 A1 | 3/2009 |
| WO | WO2009030853 A1 | 3/2009 |
| WO | WO2009089126 A1 | 7/2009 |
| WO | WO2009115611 A2 | 9/2009 |
| WO | 2010/018464 A2 | 2/2010 |
| WO | WO2010018464 A2 | 2/2010 |
| WO | 2012/145842 A1 | 11/2012 |
| WO | WO2012145842 A1 | 11/2012 |
| WO | 2013/126221 A1 | 8/2013 |
| WO | WO2013126221 A1 | 8/2013 |
| WO | WO2013173408 A1 | 11/2013 |
| WO | 2015/004434 A1 | 1/2015 |
| WO | WO2015004434 A1 | 1/2015 |
| WO | WO2016081831 A1 | 5/2016 |

OTHER PUBLICATIONS

Beekhof et al., "Secure Surface Identification Codes," *Proceedings of the SPIE 6819: Security, Forensics, Steganography, and Watermarking of Multimedia Contents X*:68190D, 2008. (12 pages).

Buchanan et al., "'Fingerprinting' documents and packaging," *Nature* 436(7050):475, 2005.

Di Paola et al., "An Autonomous Mobile Robotic System for Surveillance of Indoor Environments," *International Journal of Advanced Robotic Systems* 7(1):19-26, 2010.

Farid, "Digital Image Forensics," Lecture notes, exercises, and matlab code, CS 89/189, Darmouth College, Hanover, New Hampshire, USA, 2013, 199 pages.

Fischler et al., "Random Sample Consensus: A Paradigm for Model Fitting with Applications to Image Analysis and Automated Cartography," *Communications of the ACM* 24(6):381-395, 1981.

Huang et al., "A Novel Binarization Algorithm for Ballistics Imaging Systems," $3^{rd}$ *International Congress on Image and Signal Processing*, Yantai, China, Oct. 16-18, 2010, pp. 1287-1291.

Huang et al., "An Online Ballistics Imaging System for Firearm Identification," $2^{nd}$ *International Conference on Signal Processing Systems*, Dalian, China, Jul. 5-7, 2010, vol. 2, pp. 68-72.

Kartik et al., "Security System with Face Recognition, SMS Alert and Embedded Network Video Monitoring Terminal," *International Journal of Security, Privacy and Trust Management* 2(5):9-19, 2013.

Li, "Firearm Identification System Based on Ballistics Image Processing," *Congress on Image and Signal Processing*, Sanya, China, May 27-30, 2008, pp. 149-154.

Li, "Image processing for the positive identification of forensic ballistics specimens," *Proceedings of the $6^{th}$ International Conference of Information Fusion*, Cairns, Australia, Jul. 8-11, 2003, pp. 1494-1498.

Matsumoto et al., "Nano-artifact metrics based on random collapse of resist," *Scientific Reports* 4:6142, 2014. (5 pages).

NCOA Link, dated May 27, 2009, URL=http://ribbs.usps.gov/ncoalink/ncoalink_print.htm, download date Jun. 23, 2010, 3 pages.

Online NCOALink® Processing Acknowledgement Form (PAF) Released by Lorton Data, Jun. 2, 2009, URL=http://us.generation-nt.com/online-ncoalink-processing-acknowledgement-form-paf-released-by-press-1567191.html, download date Jun. 25, 2010, 1 page.

Rublee et al., "ORB: an efficient alternative to SIFT or SURF," *IEEE International Conference on Computer Vision*, Barcelona, Spain, Nov. 6-13, 2011, 8 pages.

Schneider et al., "A Robust Content Based Digital Signature for Image Authentication," *Proceedings of the International Conference on Image Processing*, Lausanne, Switzerland, Sep. 19, 1996, pp. 227-230.

Shi et al., "Smart Cameras: Fundamentals and Classification," Chapter 2, in Belbachir (ed.), *Smart Cameras*, Springer, New York, New York, USA, 2010, pp. 19-34.

Smith, "Fireball: A Forensic Ballistic Imaging System," *Proceedings of the $31^{st}$ Annual International Carnahan Conference on Security Technology*, Canberra, Australia, Oct. 15-17, 1997, pp. 64-70.

Takahashi et al., "Mass-produced Parts Traceability System Based on Automated Scanning of "Fingerprint of Things"," $15^{th}$ *IAPR International Conference on Machine Vision Applications*, Nagoya, Japan, May 8-12, 2017, 5 pages.

United States Postal Service, "NCOALink® Systems," URL=http://www.usps.com/ncsc/addressservices/moveupdate/changeaddress.htm, download date Jun. 23, 2010, 2 pages.

United States Postal Service, "Postal Addressing Standards," Publication 28, Jul. 2008, 55 pages.

Veena et al., "Automatic Theft Security System (Smart Surveillance Camera)," *Computer Science & Information Technology* 3:75-87, 2013.

Maddern et al., "Illumination Invariant Imaging: Applications in Robust Vision-based Localization, Mapping and Classification for Autonomous Vehicles," IEEE International Conference on Robotics and Automation, Hong Kong, China, May 31-Jun. 7, 2014, 2014, 8 pages.

Ebay, "eBay Launches Must-Have IPhone App Red Laser 3.0" published Nov. 18, 2011; https://www.ebayinc.com/stories/news/ebay-launches-must-have-iphone-app-redlaser-30/, downloaded Mar. 21, 2019, 7 pages.

Shields, "How to Shop Savvy With Red Laser," published online on Mar. 22, 2010; https://iphone.appstornn.net/reviews/lifestyle/how-to-shop-savvy-with-redlaser/, downloaded Mar. 22, 2010, 8 pages.

Entrupy.com Website History, Wayback Machine; https://web.archive.org/web/20160330060808/https://www.entrupy.com/; Mar. 30, 2016 (Year: 2016), 5 pages.

Anonymous, "Intrinsic Characteristics for Authentication" & "AlpVision Advances Security Through Digital Technology," Authentication News vol. 12, (No. 9) pp. 2, 7 and 8, dated Sep. 2006, 3 pages.

Mistry et al., "Comparison of Feature Detection and Matching Approaches: SIFT and SURF," Global Research and Development Journal for Engineering, vol. 2, Issue 4, Mar. 2017, 8 pages.

Woods, "Counterfeit-spotting truth machine launches out of Dumbo," published online on Feb. 11, 2016, downloaded from http://technically/brooklyn/2016/02/11/entrupy-counterfeit-scanner/ on Mar. 20, 2019, 3 pages.

(56) References Cited

OTHER PUBLICATIONS

Drew, M. S., et al., "Sharpening from Shadows: Sensor Transforms for Removing Shadows using a Single Image," Color and Imaging Conference, vol. 5, Society for Imaging Science and Technology, 2009, pp. 267-271.

Sharma et al., "The Fake vs Real Goods Problem: Microscopy and Machine Learning to the Rescue," KDD 2017 Applied Data Science Paper, Aug. 13-17, 2017, Halifax, NS, Canada, 9 pages.

Cavoukian et al.; "Biometric Encryption: Technology for Strong Authentication, Security and Privacy, Office of the information and Privacy Commissioner, Toronto, Ontario, Canada," 2008, in WE, International Federation lot Information Processing, vol. 261; Policies and Research in Identity Management; Eds. E. de Leeuw. Fischer-Hiibner, S. Tseng, J., Barking, J.: (Boston: Springer), pp. 57-77 (21 pages).

* cited by examiner

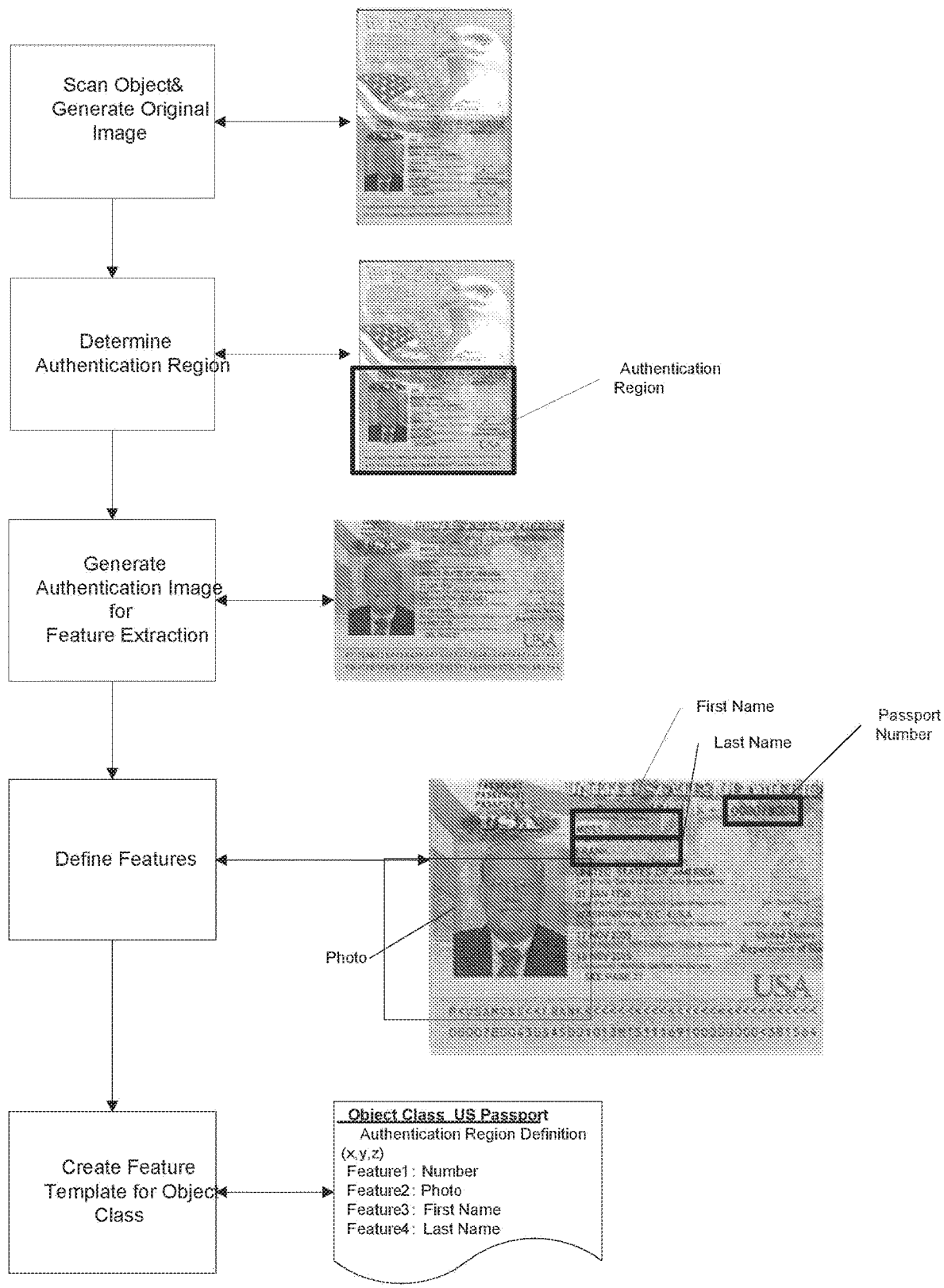
FIG. 6 SAMPLE AUTHENTICATION REGIONS

AUTHENTICATION OF A SUSPECT OBJECT USING EXTRACTED NATIVE FEATURES

RELATED APPLICATIONS

This application is a divisional application of U.S. application Ser. No. 15/044,034, filed Feb. 15, 2016, which is a divisional application of U.S. application Ser. No. 14/531,307, filed Nov. 3, 2014, now U.S. Pat. No. 9,582,714, which is a non-provisional of, and claims priority pursuant to 35 USC § 119(e) to, U.S. provisional application No. 61/898,780 filed Nov. 1, 2013, and to U.S. provisional application No. 61/914,722 filed Dec. 11, 2013. U.S. application Ser. No. 14/531,307 is also a continuation of U.S. application Ser. No. 14/290,653 filed May 29, 2014, now U.S. Pat. No. 9,350,552, which is a continuation of U.S. application Ser. No. 13/410,753 filed Mar. 2, 2012, now U.S. Pat. No. 8,774,455, which claims benefit of 61/448,465 filed on Mar. 2, 2011. U.S. application Ser. No. 14/531,307 is also a continuation of U.S. application Ser. No. 13/618,362 filed on Sep. 14, 2012, now U.S. Pat. No. 9,152,862, which claims benefit of 61/535,084 filed Sep. 15, 2011. All of the aforementioned applications are hereby incorporated by reference as though fully set forth.

Copyright © 2011-2018 Alitheon, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

BACKGROUND

Counterfeiting of manufactured goods is a worldwide problem, with recent studies estimating that 8% of the world's total GDP is now generated by the manufacturing and sales of counterfeit products. Many classes of counterfeit goods create substantial risks to public health including counterfeit pharmaceutical drugs, auto parts, pesticides, and children's toys. In addition, counterfeit computer chips, aerospace parts, and identification documents present significant risks to national security.

Authentication alone is not enough to stop counterfeiting. Counterfeiters use a variety of strategies, including diverting unfinished products from factories that make authentic goods and then adding their own counterfeit brand identifiers such as labels and tags. Counterfeit items can enter the supply chain at any point, including at the original manufacturing facility, at the shipper, in distribution, or in retail stores. Unless the manufacturer or supplier can identify exactly where and when the item entered the supply chain, identifying and eliminating the counterfeit goods can be almost impossible.

Many different approaches have been tried to uniquely identify and authenticate objects, including labeling and tagging strategies using serial numbers, bar codes, holographic labels, RFID tags, and hidden patterns using security inks or special fibers. All of these methods can be duplicated, and many add a substantial extra cost to the production of the goods sought to be protected. Physical labels and tags can also be easily lost, modified, or stolen.

SUMMARY OF THE DISCLOSURE

The following is a summary of the present disclosure in order to provide a basic understanding of some features and context. This summary is not intended to identify key/critical elements of the invention or to delineate the scope of the invention. Its sole purpose is to present some concepts of the present disclosure in a simplified form as a prelude to the more detailed description that is presented later.

In an embodiment, individual objects are scanned and a unique digital signature is generated by a digital fingerprinting method that utilizes the object's natural structure or features. The object is registered in the system database. Once the object is registered, the Digital Fingerprinting Track and Trace System can track the location of any object as it passes through a supply chain, distribution network, or sales channel. The system maintains a database record for each unique object, and can store any relevant data related to the object over the course of its lifetime. The system can be queried, generate reports, and analyze data on individual objects or on sets of objects. Applications of the system include but are not limited to object authentication, determining the provenance of an object, creating audit trails, and identifying where counterfeit goods are entering manufacturing, distribution or sales networks.

In other applications, an original digital fingerprint can be compared to a subsequent digital fingerprint of an object to establish that the object is the original, without regard to its history of locations or possession since the original digital fingerprint was acquired and stored.

Another aspect of this disclosure relates to detecting a counterfeit or forged object, for example a document such as a drivers license or passport. In this case, there may be no "original" or source object digital fingerprint for comparison. Rather, "fingerprints" of known indicia of counterfeit or forged objects can be acquired and stored. For example, a large number of bogus New York State driver's licenses might be obtained by law enforcement officials in a raid or the like. Digital images of those forged documents can be acquired, and analyzed to form digital fingerprints, as described in more detail below.

In an embodiment, "Forgery feature vectors" can be collected and stored in a database, for example, sharp, non-bleeding edges where a photograph has been replaced or torn paper fibers where an erasure occurred. These fingerprints can be searched and compared to detect a forged document. A count of "fraud indicator matches" can be compared to an empirical threshold to determine a confidence that a document is forged (or not). Additional aspects and advantages of this invention will be apparent from the following detailed description of preferred embodiments, which proceeds with reference to the accompanying drawings.

BRIEF DESCRIPTION OF THE DRAWINGS

In order to describe the manner in which the above-recited and other advantages and features of the disclosure can be obtained, a more particular description follows by reference to the specific embodiments thereof which are illustrated in the appended drawings.

Understanding that these drawings depict only typical embodiments of the invention and are not therefore to be considered to be limiting of its scope, the invention will be described and explained with additional specificity and detail through the use of the accompanying drawings in which:

FIG. 6 illustrates an example of authentication region and object feature definition for a U.S. passport.

DETAILED DESCRIPTION OF PREFERRED EMBODIMENTS

Figure 1A:
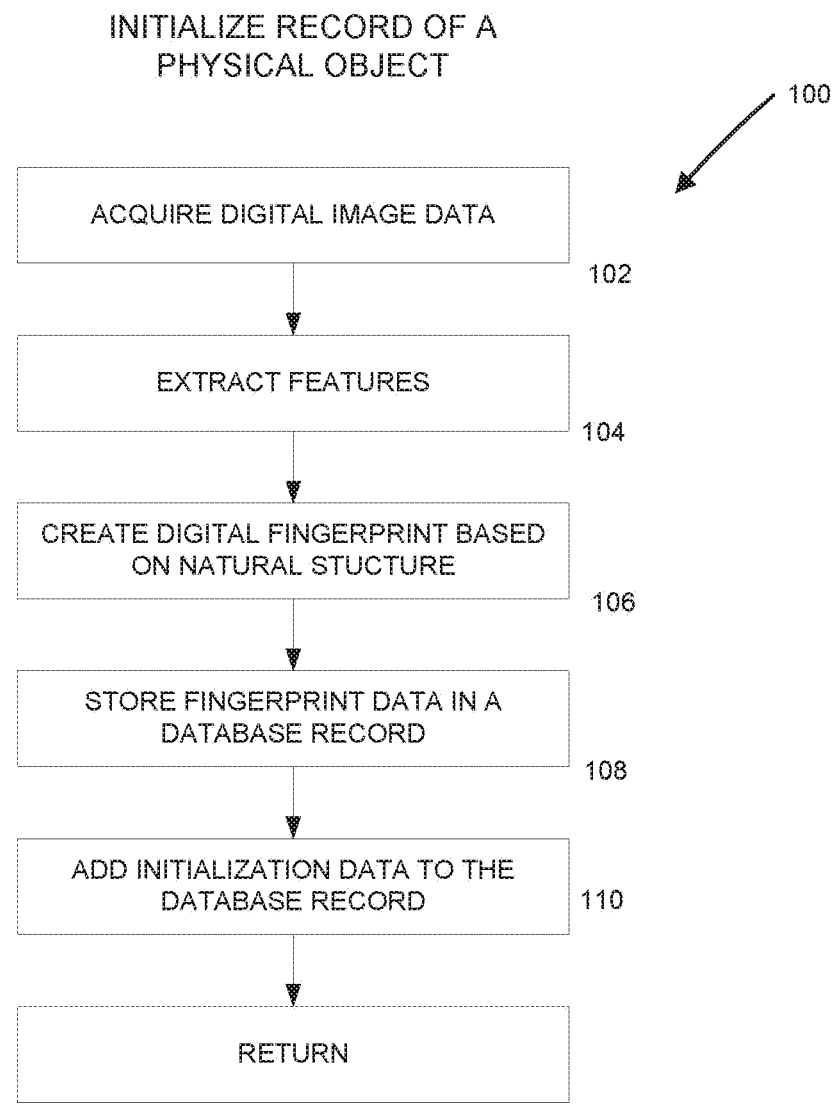
FIG. 1A is a simplified flow diagram illustrating a method for creating a storing a digital fingerprint of an object in a database.

In this application, we use the term "scan" in a broad sense. We refer to any means for capturing an image or set of images, which may be in digital form or transformed into digital form. The images may be two dimensional, three dimensional, or be in the form of a video. Thus a "scan" may refer to an image (or digital data that defines an image) captured by a scanner, a camera, a specially-adapted sensor array such as CCD array, a microscope, a smart phone camera, a video camera, an x-ray machine, etc. Broadly, any device that can sense and capture electromagnetic radiation that has traveled through an object, or reflected off of an object, is a candidate to create a "scan" of the object. Various means to extract "fingerprints" or features from an object may be used; for example, through sound, physical structure, chemical composition, or many others. The remainder of this application will use terms like "image" but when doing so, the broader uses of this technology should be implied. In other words, alternative means to extract "fingerprints" or features from an object should be considered equivalents within the scope of this disclosure.

Authentication Regions

Because digital fingerprinting works with many different types of objects, it is necessary to define what parts of the digital images of the objects are to be used for the extraction of features for authentication purposes. This can vary widely for different classes of objects. In some cases it is the image of the entire object; in other cases it will be a specific sub-region of the image of the object. For instance, for a photograph we may want to use the digital image of the entire photograph for feature extraction. Each photograph is different, and there may be unique feature information anywhere in the photograph. So in this case, the authentication region will be the entire photograph.

Multiple regions may be used for fingerprints for several reasons, two of which are particularly important. It may be that there are several regions where significant variations take place among different similar objects that need to be distinguished while, in the same objects, there may be regions of little significance. In that case a template may be used (see below) primarily to eliminate regions of little interest.

A bank note, for example, can be authenticated if a few small arbitrary regions scattered across the surface are fingerprinted, along with recognizing the contents of a region telling the value of the bank note and one containing the bank note's serial number. In such a case the fingerprints of any region (along with sufficient additional information to determine the bank note's value and its purported identity) may be sufficient to establish the authenticity of the bill and multiple fingerprinted regions are used solely in the event that one or more regions may be absent (through, for example, tearing) when the bill is later presented for authentication. Sometimes, however, all regions of an item must be authenticated to ensure the item is both authentic and has not been altered.

A passport provides an example of feature extraction from an authentication region; see FIG. 6. On a passport, the features that we may want to use for authentication may be extracted from regions containing such specific identification information as the passport number, recipient name, and recipient photo, as illustrated in FIG. 6. In that case one may define a feature template specifying those regions whose alteration from the original would invalidate the passport, such regions including the passport holder's photo and unique personal data.

The ability to define and store the optimal authentication region for a given class of objects offers significant benefits to the user, although it is not mandatory. In many cases it is much easier to scan a limited region of an object than the entire object. For instance, in the case of an article of designer clothing, it is much easier to take a picture of the manufacturer's label than it is to take a picture of the entire garment. Further, defining such regions enable the detection of partial alteration of the object.

Once an authentication region is defined, specific applications can be created for different markets and classes of objects that can assist the user in locating and scanning the optimal authentication region. For instance, an appropriately sized location box and crosshairs can automatically appear in the viewfinder of a smartphone camera application to help the user center the camera on the authentication region, and automatically lock onto the region and take the picture when the camera is focused on the correct area. It should be noted that while some examples discussed above are essentially two-dimensional objects (passport, bank note); the present disclosure is fully applicable to three-dimensional objects as well. Scanning or image capture may be 2-D, 3-D, stereoscopic, HD etc. Image capture is not limited to the use of visible light.

In many cases, objects may have permanent labels or other identifying information attached to them. These can also be used as features for digital fingerprinting. For instance, wine may be put into a glass bottle and a label affixed to the bottle. Since it is possible for a label to be removed and reused, simply using the label itself as the authentication region is often not sufficient. In this case we may define the authentication region to include both the label and the substrate it is attached to—in this case some portion of the glass bottle. This "label and substrate" approach may be useful in defining authentication regions for many types of objects, such as consumer goods and pharmaceutical packaging. If a label has been moved from its original position, this can be an indication of tampering or counterfeiting. If the object has "tamper-proof" packaging, this may also be useful to include in the authentication region.

In some cases, we will want to use multiple authentication regions to extract unique features. For a firearm, for example, we might extract features from two different parts of the weapon. It is, of course, important that both match the original but since the two parts may both have been taken from the original weapon and affixed to a weapon of substandard quality, it may also be important to determine whether their relative positions have changed as well. In other words it may be necessary to determine that the distance (or other characteristic) between Part A's authentication region and Part B's authentication region is effectively unchanged, and only if that is accomplished can the weapon be authenticated. Specifications of this type can be stored with or as part of a digital fingerprint of the firearm.

Once a suitable digital fingerprint of an object is acquired, the object (actually some description of it) and corresponding fingerprint may be stored or "registered" in a database. For example, in some embodiments, the fingerprint may comprise one or more feature vectors. The database should be secure. In some embodiments, a unique ID also may be assigned to an object. An ID may be a convenient index in some applications. However, it is not essential, as a digital fingerprint itself can serve as a key for searching a database. In other words, by identifying an object by the unique features and characteristics of the object itself, arbitrary identifiers, labels, tags, etc. are unnecessary and, as noted, inherently unreliable.

FIG. 1 is a simplified flow diagram illustrating a method 100 for creating and storing or "registering" a digital fingerprint of an object in a database. The process in one embodiment includes acquiring a digital image of the object, block 102, as discussed above. A variety of image capture technologies and devices may be used as noted. Next, features are extracted, block 104, from the digital image data. As explained, specific features or regions of interest (authentication regions) may be selected in support of subsequent identification or authentication of the object. The extracted features are analyzed and feature vectors are extracted to form a digital fingerprint—a digital file or record associated with the original image data, indicated at block 106. The digital fingerprint preferably may be stored in a database record. Other forms of searchable digital data storage should be deemed equivalents. Further, at block 110, initialization data should be added to the database record, or associated with it in a related table. This data is associated with the physical object that was scanned. For example, a description, manufacturer, model number, serial number, contents—a wide variety of data, selected as appropriate or useful depending on the type of object.

Figure 1B:
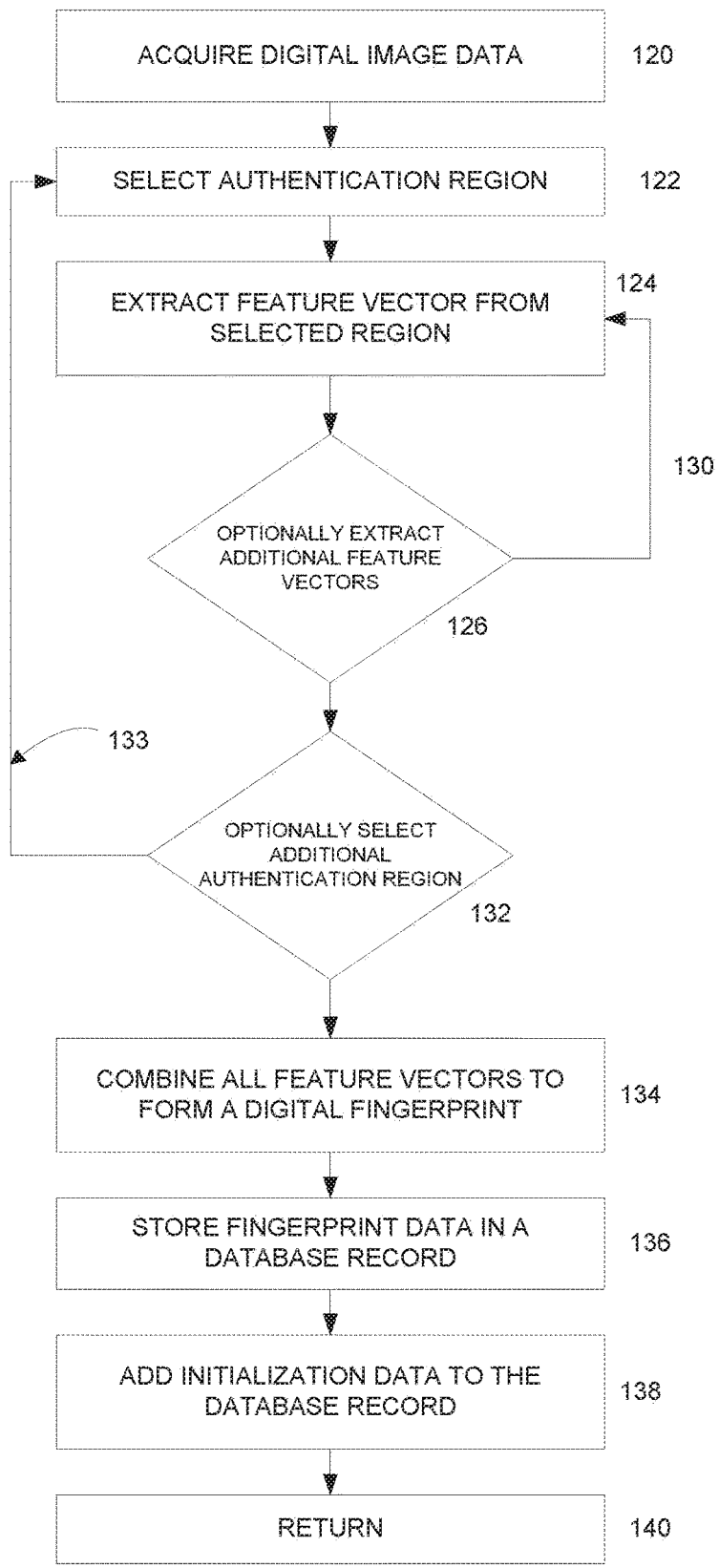
FIG. 1B illustrates a process that includes more robust feature extraction.

FIG. 1B illustrates a process that includes more robust feature extraction. In this example, we again begin with acquiring digital image data, block 120. We select at least one authentication region, block 122. This may be done by analysis of the image data, analysis of related image data, by reference to a predetermined template that defines at least one authentication region, or other means. The next block 124 calls for extracting a feature vector from the selected authentication region. A feature vector may be used to represent features of a region in a more compact form. For example, a feature vector may comprise an array of color or gray scale numeric values corresponding to areas within the selected authentication region. The values may each comprise a sum, average, maximum or other function of the individual values of a corresponding group of pixels forming a sub-part of the region. In some applications, a feature vector may identify a location and shape of a distinctive aspect within a selected region. In decision 126, there may be additional feature vectors to be extracted from the same image data. In that case, the flow returns, path 130, to repeat the feature extraction step 124. This loop 130 may repeat until all desired feature vectors are collected. Optionally, there may be another authentication region to process in the same image data, see decision 132. In that case, the outer loop 133 is traversed back to block 122 for further feature extraction with respect to one or more additional authentication regions. Then some or all of the extracted feature vectors may be combined to form a digital fingerprint, block 134, which is then stored, block 136, along with related data, block 138, as mentioned above. The process returns or concludes at block 140.

A database of digital fingerprints can form the basis of a system to track and trace the object through a supply chain, distribution network, or sales channel. A track and trace system based on digital fingerprinting has unique advantages and provides unique capabilities that are not available with track and trace systems based on traditional methods.

Holograms, bar codes and serial numbers can all be duplicated with varying degrees of effort. This means that if the code or tag can be duplicated, then counterfeit objects or two objects with the same identifier can exist in the supply chain or distribution network. They can then be registered in a traditional track and trace system. All such systems rely on determining that the anti-counterfeit item (label, hologram, RFID tag) is legitimate, not that the item itself is.

Due to this weakness, track and trace systems based on traditional approaches like bar codes or serial numbers cannot prevent the resulting corruption of the system database. A counterfeit object may be mistakenly identified as genuine, and generate a false audit trail as it is tracked through the supply chain. Two or more objects with the same ID (one genuine, one or more counterfeit) may exist at the same time. Without physically examining the objects it is impossible to tell which item is genuine. Once identification is made as to which object is genuine, the false trails must be removed from the database to restore integrity. This can be extremely difficult depending on the structure of the database and the complexity of the tracking data. In some cases the objects may not have any further contact with the track and trace system (for instance if they are purchased by a consumer), and the record will never be identified as false, leaving the database permanently corrupted.

In one embodiment of the Digital Fingerprinting Track and Trace System, an item may be scanned and identified at initial manufacture. Alternatively, an item may be scanned and identified at any subsequent time or location for entry into a tracking system. This point of identification preferably is done when the item is either in the possession of its manufacturer or has been transferred by secure means to the current holder so that its legitimacy at the point of identification is adequately established.

Figure 2:
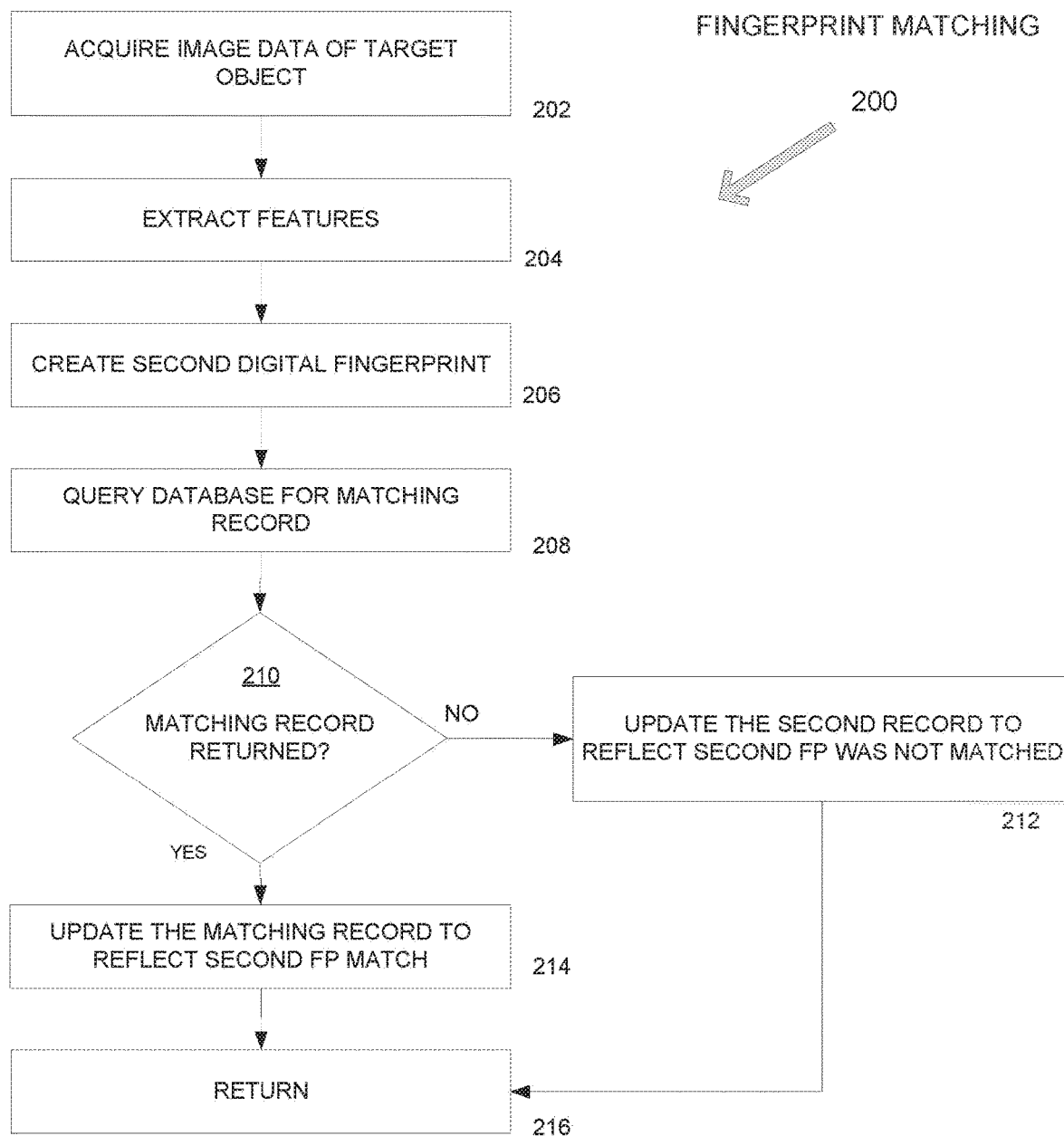
FIG. 2 is a simplified flow diagram illustrating a method for matching a digital fingerprint of a target object to a database of existing digital fingerprints.

The system then identifies the object every time it is scanned again, typically at discrete steps in manufacturing, distribution, and sale. FIG. 2 is a simplified flow diagram illustrating a method 200 for matching a digital fingerprint of a target object to a database of existing digital fingerprints. Here, we acquire image data of a "target object" i.e., the object we want to identify or authenticate by finding a match in the database, see block 202. We extract features from the target object image data, block 204, as discussed above. Then we create a new (second) digital fingerprint based on the extracted features, block 206. The next step is querying the database, block 208, for a record that matches the second digital fingerprint record. "Matching" in this context may be relative to a threshold confidence level rather than a binary decision. The requisite confidence level may vary depending on the specific application. The confidence level required may be varied dynamically responsive to the data and experience with a given system. If no "matching" record is returned, decision 210, update the second record (the digital fingerprint of the target object), block 212, to reflect that no match was found. If a match is returned, the matching record is updated to reflect the match, for example, it may be linked to the second record. The results may be returned to the user.

Figure 3:
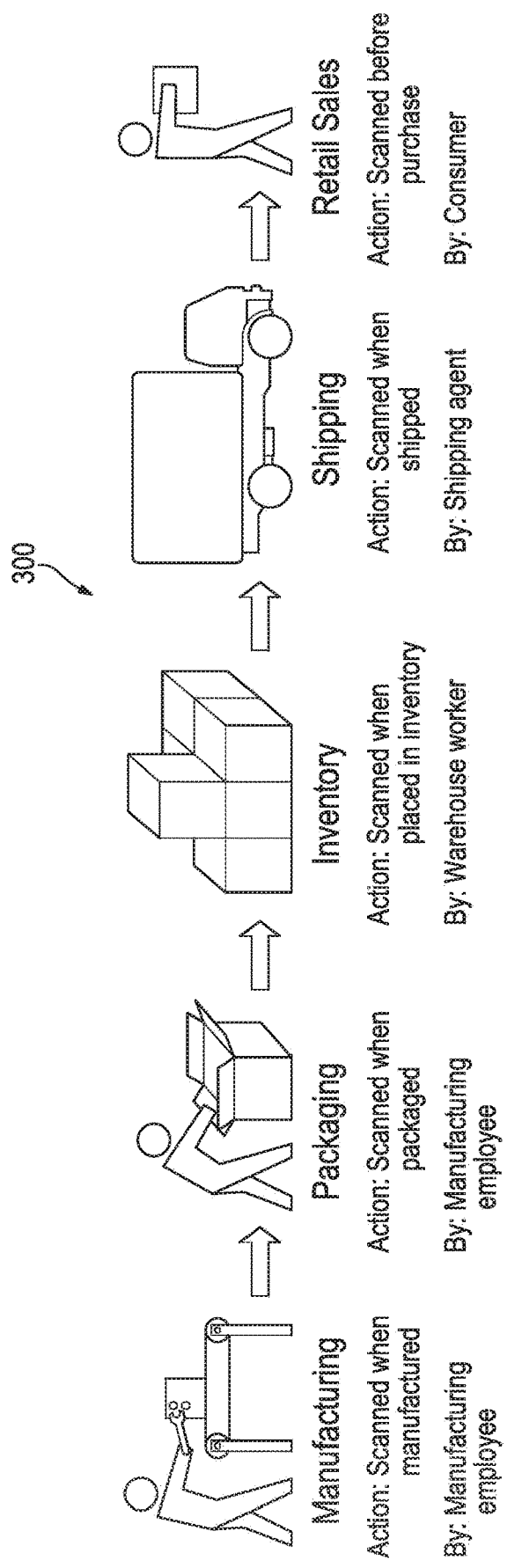
FIG. 3 is a simplified conceptual diagram showing scanning of an object at various times and places along a manufacture and distribution chain.

Typical tracking steps might include scanning at the point of manufacture, when packaged, when placed in inventory, when shipped, and at a retail point of purchase (upon arrival and again when sold), as illustrated in the tracking process 300 of FIG. 3. Each scan can be used to update a remote database.

As mentioned earlier, a "scan" may refer to an image (or digital data that defines an image) captured by a scanner, a camera, a specially-adapted sensor array such as CCD array, a microscope, a smart phone camera, a video camera, an x-ray machine, etc. Broadly, any device that can sense and capture electromagnetic radiation that has traveled through an object, or reflected off of an object, is a candidate to create a "scan" of the object. It is critical to capture at least one native feature of the object, as distinguished from a feature added to the object for identification, such as a label, bar code, RFID tag, serial number, etc.

A "native feature" in this description is not concerned with reading or recognizing meaningful content. For example, a label on a scanned object with a printed serial number may give rise to various features in fingerprint processing, some of which may become part of a digital fingerprint feature set or vector that is associated with the object. The features may refer to light and dark areas, locations, spacing, ink blobs, etc. This information may refer to the printed serial number on the label, but there is no effort to actually "read" or recognize the printed serial number (which may be bogus). Similarly, an RFID tag applied to an object may give rise to a fingerprint vector responsive to its appearance and location on the object. However, no effort is made to actually stimulate or "read" data or signals from the tag.

While the most common application of track and trace systems is in manufactured goods, the present system and methods, in various different embodiments, may be applied to any object that can be identified with a digital fingerprint and tracked. These include but are not limited to mail pieces, parcels, art, coins, currency, precious metals, gems, jewelry, apparel, mechanical parts, consumer goods, integrated circuits, firearms, pharmaceuticals and food and beverages. Tracking may consist of any sequence of actions where the object is scanned, such as each time an object is appraised, authenticated, certified, auctioned, displayed, or loaned. The system may store both positive and negative authentication transactions. In an embodiment, the system may store location information (associated with a scan or fingerprint), which provides a profile of where counterfeit goods may be encountered.

Figure 4:
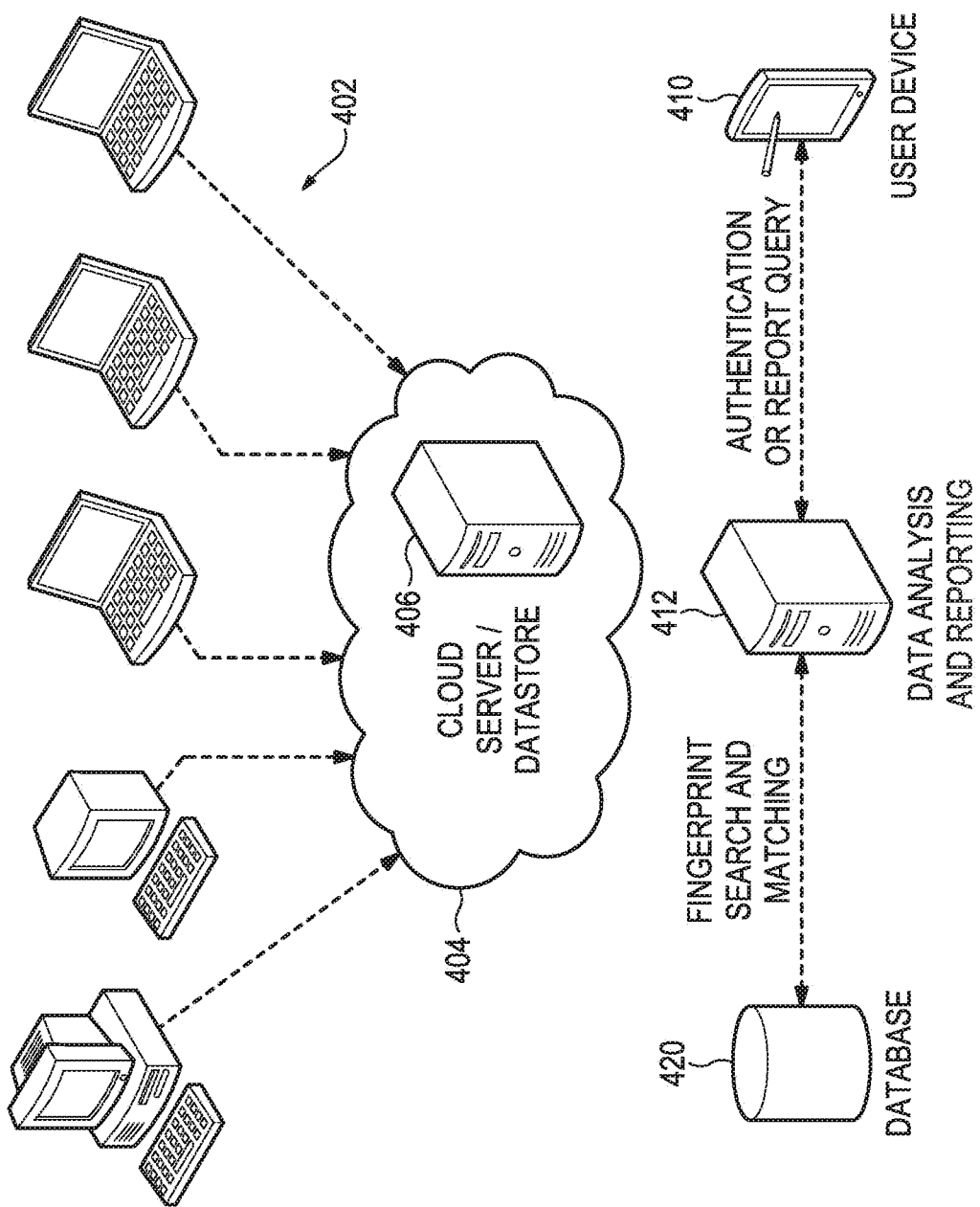
FIG. 4 is a simplified conceptual diagram illustrating use of a mobile device application to query authentication information related to an object.

FIG. 4 is a simplified conceptual diagram illustrating use of a mobile device application to query authentication information related to an object. Here, various computing devices or terminals 402 may have access over a network, for example, the Internet 404, to cloud computing facilities/services such as a cloud server/datastore 406. For example, the devices 402 may be located at various points along a distribution chain as illustrated in FIG. 3, each location scanning an object and updating the cloud server/datastore 406.

A server 412 may be provisioned to provide tracking and/or tracing data analysis and reporting. The server 412 has access to a datastore 420 which may be used to store digital fingerprints and related data. The server can query or search the database 420 for digital fingerprint search and matching. The database 420 preferably is coupled to the cloud server 406 in some embodiments. A mobile user device 410 such as a smartphone, tablet, laptop computer or dedicated device may be configured for communications with the server 412 to request and receive a reply or authentication report for an object of interest. This architecture is simplified and in any event is merely illustrative and not intended to be limiting.

Continuous and Discrete Tracking

In some implementations, sensors may be attached to the object, and sensor data can flow back to the database in either a continuous fashion (near real time), or in discrete data transfer events. For example, data transfer may occur when an authentication event occurs. For instance, if there is a GPS chip attached to the object, data flow can start when the object is first registered in the system, and continue to flow as the object changes location. Continuous (frequent) data updates can also be buffered in local memory in a sensor attached to the item, and then downloaded the next time the object is scanned and authenticated. This provides a record of where the object has traveled (its itinerary).

As an example of the potential uses of sensor data, many products like food and beverages can degrade with exposure to certain environmental factors over the course of their storage and shipment. Examples of sensor data could include temperature, light exposure, altitude, oxygen level, or other factors, as well as location such as GPS data.

Figure 5:
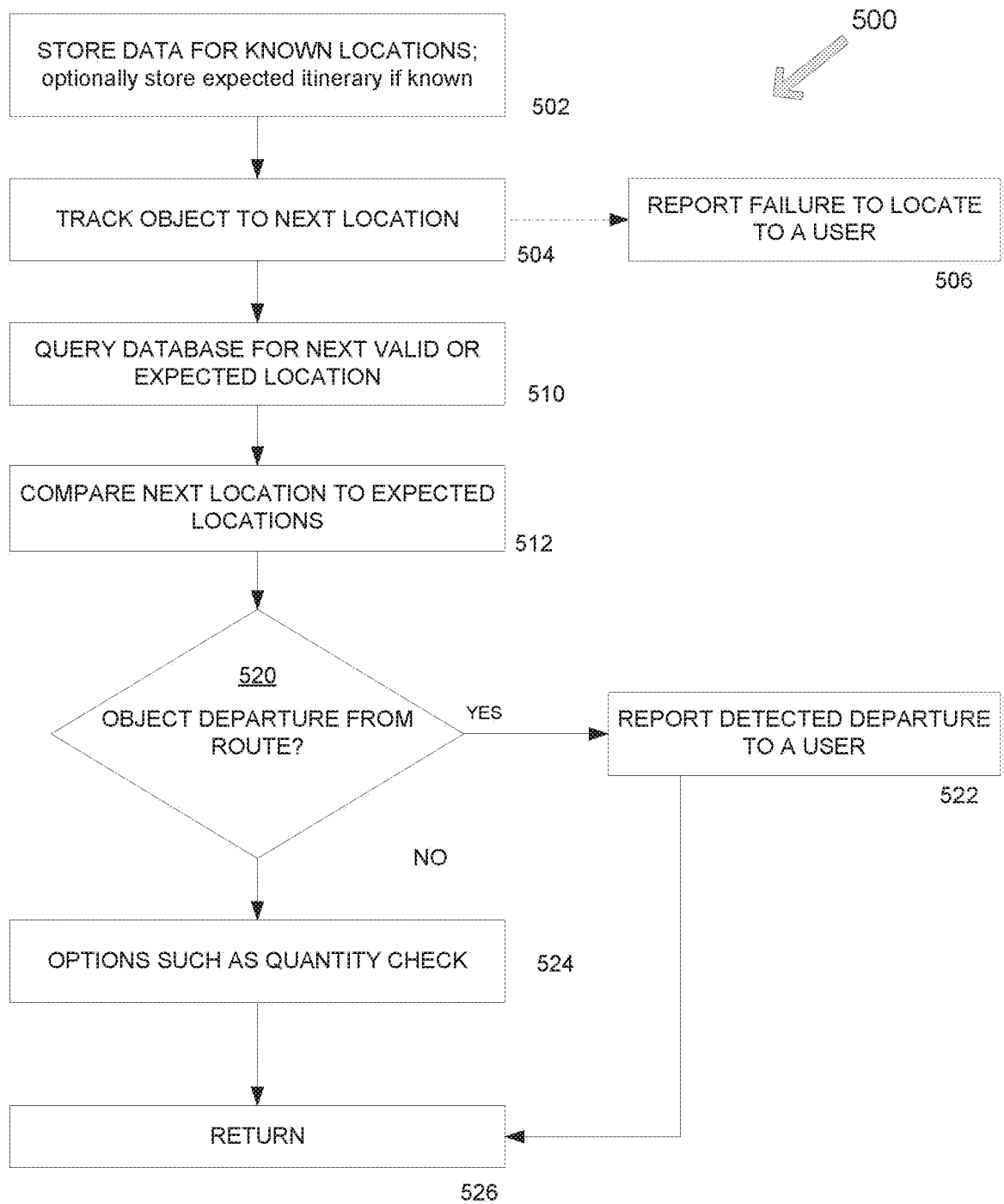
FIG. 5 is a simplified flow diagram illustrating a method for tracking an object to verify its provenance.

FIG. 5 is a simplified flow diagram illustrating one embodiment of a process 500 for tracking an object to verify its provenance. Here, an expected itinerary of an object (a series of locations) may be stored in a datastore if known, block 502. The methods and systems described above may be used to track the object to the next location, block 504. If the object does not arrive as expected (where and when expected according to the itinerary), the failure may be reported to a user. In an embodiment, an object that arrives later than expected may be subjected to closer matching scrutiny to ensure its identity.

The next step, block 510, is to query the database for the next valid or expected location. A unique itinerary may not be known, but a set of valid or expected locations may be known. The next actual location of the object (as determined by imaging and matching digital fingerprints) may be compared to the expected location(s) returned by the database, block 512. If that comparison indicates a departure from the expected or authorized route, decision 520, the result may be reported to a user, block 522. (A report that the object is on track may be reported as well.) Other options may be implemented such as a quantity check, block 524. The process returns or terminates at block 526.

Most existing track and trace systems are only designed to be accessed by manufacturers or their authorized distributors, and often require specialized scanners or equipment. However, the consumer also has a vested interest in determining whether the items that they are buying are authentic. In some embodiments, the present system is designed to enable anyone along the supply, distribution, or sales chain, from manufacturer to the retail consumer, to access the system and determine whether the item is authentic. A specialized scanner is not required in all cases. For example, in one embodiment a mobile phone application designed for the consumer can be used to scan an object, query the database, and determine if the object is authentic.

Finally, data collected by a digital fingerprinting system offers a variety of useful information to people along the supply, distribution and sales chain. Reports can be generated on individual items, or on sets of items. These reports can include but are not limited to the locations of items over time, audit trails, points of entry of counterfeit goods, and exposure to environmental variables over the course of an object's useful lifetime.

Tags and Bar Codes

A tag may be added to an item, a barcode to a mail piece, etc. for two reasons. First, the human may need it to know what the item is. This is the identification function. It may identify the item to a store clerk as a particular style and size of clothing of a particular manufacturer; it may tell a postal carrier where to deliver a mail piece. Second, however, are tags that are only useful for a machine. Thus a four-state bar code on a mail piece (unreadable by humans) is used to route the mail piece by machine. This entire class of machine readable tags can be replaced by the methods of this patent. The first set may still be needed for human use but are now divorced from their authentication function.

Because we are exploiting natural features and often scanning the object under variable conditions, it is highly unlikely that two different "reads" will produce the exact same fingerprint. We therefore have to introduce the ability to look up items in the database when there is a near-miss. For example, two feature vectors [0, 1, 5, 5, 6, 8] and [0, 1, 6, 5, 6, 8] are not identical but (given the proper difference metric) may be close enough to say with certainty that they are from the same item that has been seen before. This is particularly true if, otherwise, the nearest feature vector of a different item is [5, 2, 5, 8, 6, 4]. For example, a distance between vectors of n-dimensions is easily calculated, and may be used as one metric of similarity or "closeness of match" between the vectors. One may also consider the distance to the next nearest candidate.

Obviating the Chain of Custody

Many systems rely on a known "chain of custody" to verify authenticity of an object. The rules of evidence in court, for example, typically require proof of a chain of custody to demonstrate authenticity of a hair sample, weapon or other piece of physical evidence. From the time an object is collected at a crime scene, for example, it is typically bagged, tagged, and moved into a locked box or evidence room for safekeeping. Each person who removes it must attest to returning the original item unchanged. Custody of the object from the crime scene to the evidence locker to the courtroom must be accounted for as an unbroken chain. Digital fingerprinting techniques as disclosed herein can be used to obviate most of that process. Provided an original object is under the control and custody of an authorized or trusted entity at least once, and a digital fingerprint, or an image suitable for forming a digital fingerprint of the object, is acquired under such circumstances, and stored, the object is uniquely identifiable thereafter by that fingerprint for the lifetime of the object.

Because digital fingerprinting works by extracting key features of an object, it may be used to identify or authenticate objects even after a good deal of wear and tear. At any subsequent time, a suspect or "target" object can be similarly "fingerprinted" and the subsequent fingerprint compared to the stored fingerprint of the original object. If they match, authenticity is established, regardless of where or in whose custody the object may have traveled in the meantime. Returning to the crime scene example, if a digital fingerprint is acquired of a weapon taken from the crime scene, and the digital fingerprint stored, the weapon can be fingerprinted again at any subsequent time, and the digital fingerprints compared to authenticate to weapon. Custody of the weapon in the interim is no longer an issue. Likewise when a coin or piece of art is stolen our technology gives us the ability to continue the original provenance even though chain of custody has been lost (i.e. we know it is the same coin we saw before even though it has not been in our direct possession during the time between theft and recovery).

Global Vs. Regional Feature Matching

In a case where we have the original document or other object fingerprinted, our techniques allow region-by-region matching so that we can tell what (if any) regions have been changed. Thus, for example, we might get a really good overall match on a passport but none of the matches happen in the photograph—so we know the photograph probably was changed. Further, if some individual or group, say Al Qaeda, has a certain pattern or regularity to altering passports—change the photo, the date of birth and one digit of the passport number, say—then this ability to find altered regions also gives us the ability to discern the pattern of changes and thus develop a signature of the group making the changes. Thus aspects of the present technology can be applied not only to detect a forged or altered document, but to identify in some cases the source of the bogus document.

It will be obvious to those having skill in the art that many changes may be made to the details of the above-described embodiments without departing from the underlying principles of the invention. The scope of the present invention should, therefore, be determined only by the following claims.

The invention claimed is:

1. A forgery detection system, comprising:
a computer server;
a database system operatively coupled to the computer server, the database system storing a forgery database comprising multiple digital fingerprint records, each of the digital fingerprint records having at least one feature vector extracted from a forged or altered object of a given object type; and
instructions stored in non-volatile memory and executable in the computer server to cause the computer server to:
access a digital image of a suspect object of the given object type, wherein the digital image of the suspect object is captured by a scanner, a camera, a specially-adapted sensor array such as CCD array, a microscope, a smart phone camera, or video camera;
select an authentication region of the digital image;
extract a native feature within the selected authentication region wherein the native feature describes physical characteristics of the selected authentication region without recognizing content that appears in the selected authentication region;
form a feature vector to represent the native feature in a compact form;
query the database system based on the feature vector to obtain a result responsive to zero or more of the digital fingerprint records stored in the database system matching the feature vector, each matching digital fingerprint record defining a fraud indicator match;
for each defined fraud indicator match, incrementing a count of fraud indicator matches;
compare the count of fraud indicator matches to a predetermined threshold value to determine a confidence level that the suspect object is forged or altered;
generate a report based on the comparison; and
transmit the report to a user interface.

2. The system of claim 1 wherein:
at least some of the multiple digital fingerprint records of the forgery database include plural features from a single digital image; and for at least some of the plural features, the stored instructions cause the computer server to:
extract an additional feature from the single digital image;
query the database system to find digital fingerprint records that match the additional feature;
increment the count of fraud indicator matches; and
update the determined confidence level that the suspect object is forged or altered.

3. The system of claim 1 wherein:
the forgery database comprises digital fingerprint records that include at least one corresponding feature from each one of multiple authentication regions; and
the stored instructions cause the computer server to:
select a first authentication region based on the given object type;
extract a first feature from the first authentication region;
query the database system to identify first digital fingerprint records that match the first authentication region and first feature data pair;
select a second authentication region based on the given object type;
extract a second feature from the second authentication region;
query the database system to identify second digital fingerprint records that match the second authentication region and second feature data pair; and
include a count of both first and second matching records in the count of fraud indicator matches.

4. The system of claim 1 wherein the given object type is one of a negotiable instrument as defined in the Uniform Commercial Code, a bill of lading or shipping document, an original work of art, a label on a bottle of wine.

5. The system of claim 1 wherein selecting the authentication region is based on a predetermined template accessible to the computer server that defines at least one authentication region for the given object type.

6. The system of claim 1 wherein at least some of the multiple digital fingerprint records stored in the database system include data that indicates a source of the corresponding forged or altered object; and
the stored instructions executable in the computer server further to cause the computer server to:
generate or include in the report to the user interface an indication of the source(s) of the matching record(s) to help identify persons or entities that may have forged or altered the suspect object.

7. The system of claim 1 wherein the stored instructions executable in the computer server further to cause the computer server to select the predetermined threshold value for determining the confidence level based on the given object type.

8. The system of claim 1 wherein the confidence level is determined empirically.

9. The system of claim 1 wherein the stored instructions executable in the computer server further to cause the computer server, in a case that the result returns no matching record, to update the digital fingerprint of the suspect object to reflect that no match was found.

10. The system of claim 1 wherein the stored instructions executable in the computer server further to cause the computer server, in a case that the result returns a matching record, to update the digital fingerprint of the matching record to reflect that the match was found.

11. The system of claim 10 wherein the stored instructions executable in the computer server further to cause the computer server to update the digital fingerprint of the matching record to include a link to the suspect object or a record associated with the suspect object.

12. A method, comprising:
acquiring digital image data from at least a selected authentication region of an object, without printing or adding anything on to the object, and wherein the object has been previously forged or altered at least in the selected authentication region from its original state;
extracting at least one native feature from the acquired digital image data;
wherein the at least one native feature describes physical characteristics of the selected authentication region without recognizing content that appears in the selected authentication region;
forming a feature vector to represent the native feature in a compact form;
storing the feature vector in a database record as part of a digital fingerprint of the object in a forgery database for use in detecting forged or altered objects among a class of objects to which the forged or altered object belongs;
repeating the foregoing acquiring, extracting, forming and storing over additional forged or altered objects of the class of objects;
based on the repeating, adding additional records to the forgery database, the additional records comprising feature vectors representing corresponding native features of the selected authentication region in the additional forged or altered objects;
acquiring second digital image data of a portion of a suspect object, wherein the portion of the suspect object corresponds to the selected authentication region used to build the forgery database;
extracting second features from the second image data;
forming a second feature vector to represent the second features in the compact form;
querying the forgery database using the second feature vector to obtain a result based on zero or more stored feature vectors that match the second feature vector, each stored feature vector that matches the second feature vector defining a fraud indicator match;
counting a number of fraud indicator matches;
comparing the number of fraud indicator matches to a predetermined threshold value to determine a confidence level that the suspect object is forged or altered;
generating a report of the determined confidence level based on the comparison; and
transmitting the report to a user interface.

13. The method of claim 12 wherein each feature vector comprises an array of color or gray scale numeric values corresponding to a sub-region within the selected authentication region.

14. The method of claim 13 wherein the numeric values in the array each comprise a mathematical function combining individual values of a corresponding group of pixels forming the sub-region of the selected authentication region.

15. The method of claim 14 wherein the mathematical function is selected from a set of functions that includes a sum, maximum, and average of the individual values.

16. The method of claim 12 wherein extracting feature information includes selecting the authentication region based on a predetermined template that defines at least one authentication region for the class of objects to which the forged or altered objects belong.

17. The method of claim 12 wherein at least one digital fingerprint stored in the forgery database corresponds to a forged or altered numismatic object.

18. A method, comprising:

provisioning a forgery database storing digital fingerprint records, each of the digital fingerprint records having at least one feature vector extracted from a forged or altered object, and at least some of the digital fingerprint records stored in the forgery database identifying a pair of authentication regions in the corresponding forged or altered object and a known distance between the pair of authentication regions;

accessing a digital image of a suspect object, wherein the digital image of the suspect object is captured by a scanner, a camera, a specially-adapted sensor array such as CCD array, a microscope, a smart phone camera, or video camera;

analyzing the digital image to locate the pair of authentication regions;

determining a distance between the pair of authentication regions in the digital image;

querying the forgery database to identify matching digital fingerprint records based on the pair of authentication regions and the known distance;

generating a count of matching digital fingerprint records returned in response to the querying;

comparing the count of matching digital fingerprint records to a predetermined threshold value to determine a confidence level that the suspect object is forged or altered;

generating a result based on the comparison; and storing the result.

19. The method of claim 18, comprising:

updating a digital fingerprint of a matching record to include a link to the suspect object or a record associated with the suspect object.

* * * * *